(12) United States Patent
Witker

(10) Patent No.: US 12,371,446 B2
(45) Date of Patent: Jul. 29, 2025

(54) CATALYST PARTICLES AND METHODS FOR DEHYDROGENATIVE SILYLATION

(71) Applicant: DOW SILICONES CORPORATION, Midland, MI (US)

(72) Inventor: David Lawrence Witker, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/786,571

(22) PCT Filed: Dec. 17, 2020

(86) PCT No.: PCT/US2020/065612
§ 371 (c)(1),
(2) Date: Jun. 17, 2022

(87) PCT Pub. No.: WO2021/127179
PCT Pub. Date: Jun. 24, 2021

(65) Prior Publication Data
US 2023/0042996 A1 Feb. 9, 2023

Related U.S. Application Data

(60) Provisional application No. 62/949,881, filed on Dec. 18, 2019.

(51) Int. Cl.
| | | |
|---|---|---|
| *C07F 7/12* | (2006.01) | |
| *B01J 31/20* | (2006.01) | |
| *B01J 31/24* | (2006.01) | |
| *B01J 35/23* | (2024.01) | |
| *B01J 37/00* | (2006.01) | |

(52) U.S. Cl.
CPC .............. *C07F 7/122* (2013.01); *B01J 31/20* (2013.01); *B01J 31/2404* (2013.01); *B01J 35/23* (2024.01); *B01J 37/009* (2013.01); *B01J 2531/821* (2013.01)

(58) Field of Classification Search
None
See application file for complete search history.

(56) References Cited

U.S. PATENT DOCUMENTS

| | | |
|---|---|---|
| 4,252,678 A | 2/1981 | Smith |
| 4,331,825 A | 5/1982 | Whyman |
| 4,668,812 A | 5/1987 | Quirk et al. |
| 4,927,953 A | 5/1990 | Takatsuna et al. |
| 6,291,622 B1 | 9/2001 | Drose et al. |
| 9,447,125 B2 | 9/2016 | Roy et al. |
| 2016/0102178 A1 | 4/2016 | Roy et al. |
| 2017/0260215 A1 | 9/2017 | Nagashima et al. |
| 2019/0329231 A1 | 10/2019 | Bousquie et al. |
| 2020/0353454 A1 | 11/2020 | Meille et al. |

FOREIGN PATENT DOCUMENTS

| | | |
|---|---|---|
| CN | 1261074 A | 7/2000 |
| CN | 101787045 A | 7/2010 |
| FR | 3061183 A1 | 6/2018 |
| JP | S56122390 A | 9/1981 |
| JP | H035489 A | 1/1991 |
| JP | 2005075807 A | 3/2005 |
| JP | 2017088909 A | 5/2017 |
| WO | 2014056889 A1 | 4/2014 |
| WO | 2018190999 A1 | 10/2018 |
| WO | 2019138194 A1 | 7/2019 |

OTHER PUBLICATIONS

Chris et al. Organometallics, 14, 1082 (Year: 1995).*
Nesmeyanov, A.N. et al., "Addition, Substitution, and Telomerization Reactions of Olefins in the Presence of Metal Carbonyls or Colloidal Iron", Tetrahedron, 1962, vol. 17, pp. 61 to 68.
International Search Report for PCT/US2020065612 dated Mar. 12, 2021, 7 pages.
International Search Report for PCT/US2020/065615 dated Mar. 12, 2021, 5 pages.

(Continued)

*Primary Examiner* — Yun Qian
(74) *Attorney, Agent, or Firm* — Warner Norcross + Judd LLP

(57) ABSTRACT

A method of preparing catalyst particles (the "preparation method") is disclosed. The preparation method comprises combining a Ru(0) complex and a carrier fluid to form a mixture and heating the mixture at an elevated temperature to nucleate the Ru(0) complex and give the catalyst particles in the carrier fluid. The preparation method optionally comprises isolating the catalyst particles from the carrier fluid. A method of preparing an organosilicon compound via dehydrogenative silylation with the catalyst particles (the "synthesis method") is also disclosed. The synthesis method comprises reacting (A) an organohydridochlorosilane compound and (B) an alkene compound in the presence of (C) a catalyst, thereby preparing the organosilicon compound. The catalyst (C) of the synthesis method comprises the catalyst particles prepared by the preparation method.

10 Claims, No Drawings

(56) References Cited

OTHER PUBLICATIONS

Ojima et al., "The Reactions of Hydrosilanes with Trifluoropropene and Pentafluorostyrene Catalyzed by Ruthenium, Rhodium and Palladium Complexes" Journal of Organometallic Chemistry, vol. 260, Issue 3 (1984), pp. 335-346.
Mager et al., "Synthesis of Water-Soluble Ruthenium Clusters by Reaction with PTA (1,3,5-triaza-7-phosphaadamantane)", Journal of Organometallic Chemistry, vol. 794 (2015), pp. 48-58.
Vogel et al., "Oxygen and Carbon Monoxide Interaction on Novel Clusters Like Ruthenium: A WAXS Study", Journal of Catalysis, vol. 232, Issue 2 (2005), pp. 395-401.
Fontal et al., "Catalytic Studies with Ruthenium Clusters Substituted with Diphosphines: Part I. Studies with Ru3(CO) 10(Ph2PCH2PPh2)", Journal of Molecular Catalysis A: Chemical, vol. 149, Issues 1-2 (1999), pp. 75-85.
Seki et al., "Single Operation Synthesis of Vinylsilanes From Alkenes and Hydrosilanes with the Aid of Ru3(CO)12", Am. Chem. Soc., J. Org. Chem. (1986), vol. 51, No. 20, pp. 3890-3895.
Lachaize et al., "Mechanistic Studies on Ethylene Silylation with Chlorosilanes Catalysed by Ruthenium Complexes", Chemical Communications 2 (2003), pp. 214-215.
Lachaize et al., "Supplementary Data Mechanistic Studies on Ethylene Silylation with Chlorosilanes Catalysed by Ruthenium Complexes", (2003) found at: http://www.rsc.org/suppdata/cc/b2/b210552g/b210552g.doc (accessed on Oct. 20, 2022), 2 pages.
Lachaize et al., "Silyl and σ-Silane Ruthenium Complexes: Chloride Substituent Effects on the Catalysed Silylation of Ethylene", Dalton Transactions vol. 39., No. 36 (2010), pp. 8492-8500.
Machine assisted English translation of JP2017088909A obtained from https://patents.google.com/patent on Oct. 21, 2022, 21 pages.
Alvarez-Rodriguez, et al. "Structural changes on RuCu/KL bimetallic catalysts as evidenced by n-hexane reforming." Catalysis Today 133 (2008) pp. 793-799.
Guczi, et al., "From Molecular Clusters to Metal Nanoparticles", Topics in Catalysis vol. 19, No. 2 (2002) pp. 157-163.
Lu et al., "Iridium-Catalyzed (Z)-Trialkylsilylation of Terminal Olefins", The Journal of Organic Chemistry 75.5 (2010) pp. 1701-1705.
Cheng et al., "Iridium-Catalyzed, Diastereoselective Dehydrogenative Silylation of Terminal Alkenes with (TMSO) 2MeSiH" Angewandte Chemie International Edition, 52(34), (2013) pp. 8984-8989.
Bokka et al., "Regio- and Stereoselective Dehydrogenative Silylation and Hydrosilylation of Vinylarenes Catalyzed by Ruthenium Alkylidenes." Organic letters 18.20 (2016) pp. 5324-5327.
Fernandez et al., "Synthesis and Reactions of Dihydrido(triethylsilyl)(1,5-cyclooctadiene)iridium(III) Complexes: Catalysts for Dehydrogenative Silylation of Alkenes", Organometallics, 5(7) (1986) pp. 1519-1520.
Oro et al., "Hydrosilylation of Alkenes by Iridium Complexes", Journal of Molecular Catalysis, vol. 37, Issues 2-3 (1986) pp. 151-156.
Marciniec et al., "Catalysis of Hydrosilylation Part XXV. Effect of Nickel(O) and Nickel(II) Complex Catalysts on Dehydrogenative Silylation, Hydrosilylation and Dimerization of Vinyltriethoxysilane", Journal of Organometallic Chemistry, vol. 484, Issues 1-2, (1994) pp. 147-151.
Marciniec et al., "Competitive Dehydrogenative Silylation and Hydrogenative Dimerization of Vinyltriethoxysilane Catalyzed by the [Ni(acac)2] + PPh3 System, Intermediate and Mechanistic Implications", Journal of Organometallic Chemistry, vol. 521, Issues 1-2, (1996) pp. 245-251.
Maciejewski et al., "Catalysis of Hydrosilylation: Part XXXIV. High Catalytic Efficiency of the Nickel Equivalent of Karstedt Catalyst" Journal of Organometallic Chemistry 597(1-2) (2000) pp. 175-181.
Maciejewski et al., "Intermediates in Nickel(0)-Phosphine Complex Catalyzed Dehydrogenative Silylation of Olefins", Inorganica Chimica Acta, vol. 359, Issue 9 (2006) pp. 2989-2997.
Takeuchi et al., "Cationic Rhodium Complex-Catalyzed Highly Selective Dehydrogenative Silylation of Styrene", Organometallics, 15, 8, (1996) 2098-2102.
Lin et al., "Wettability-Driven Palladium Catalysis for Enhanced Dehydrogenative Coupling of Organosilanes", ACS Catalysis, 7(3) (2017) pp. 1720-1727.
Wissing et al., "Tuning the Selectivity of AuPd Nanoalloys towards Selective Dehydrogenative Alkyne Silylation", Chemistry—A European Journal, vol. 25, Issue 23 (2019) pp. 5870-5874.
Saridakis et al., "Unique Reactivity of Dihydrosilanes under Catalysis by Supported Gold Nanoparticles: cis-1,2-Dehydrogenative Disilylation of Alkynes", ChemCatChem, vol. 10, Issue 5 (2018) pp. 980-983.
Titilas et al., "Tandem Si—Si and Si—H Activation of 1,1,2,2-Tetramethyldisilane by Gold Nanoparticles in Its Reaction with Alkynes: Synthesis of Substituted 1,4-Disila-2,5-cyclohexadienes", Organometallics 34, 8 (2015) pp. 1597-1600.
Machine assisted English translation of JP2005075807A obtained from <https://patents.google.com/patent> on Sep. 19, 2024, 7 pages.
Machine assisted English translation of CN101787045A obtained from https://patents.google.com/patent on Feb. 3, 2025, 7 pages.
Machine assisted English translation of JPS56122390A obtained from https://worldwide.espacenet.com/patent on Feb. 3, 2025, 7 pages.

* cited by examiner

CATALYST PARTICLES AND METHODS FOR DEHYDROGENATIVE SILYLATION

CROSS-REFERENCE TO RELATED APPLICATIONS

This application is the U.S. National Stage of International Application No. PCT/US2020/065612 filed on 17 Dec. 2020, which claims priority to and all advantages of U.S. Provisional Patent Application No. 62/949,881 filed on 18 Dec. 2019, the content of which is incorporated herein by reference.

FIELD OF THE INVENTION

The present disclosure relates generally to a catalyst and methods for preparing organosilicon compounds and, more specifically, to methods of preparing catalyst particles for dehydrogenative silylation reactions and methods relating to preparing and using the same for preparing vinylsilanes via dehydrogenative silylation.

DESCRIPTION OF THE RELATED ART

Hydrosilylation reactions are generally known in the art and involve an addition reaction between silicon-bonded hydrogen and aliphatic unsaturation. Hydrosilylation reactions are utilized in various applications, such as for cross-linking components of curable compositions. Hydrosilylation reactions may also be utilized to prepare individual components or compounds, e.g. components for inclusion in such curable compositions. Typically, hydrosilylation reactions are carried out in the presence of a platinum metal-based catalyst due to its excellent catalytic activity and stability. While platinum metal is generally much more expensive than other metals with lesser catalytic activities, non-platinum catalysts suffer from instability when exposed to ambient conditions. In particular, non-platinum catalysts can be prone to undesirable side reactions with ambient oxygen and water, thereby limiting use and potential end applications thereof.

Like hydrosilylation reactions, dehydrogenative silylation reactions are also known in the art and similarly involve a reaction between a silicon-bonded hydrogen and aliphatic unsaturation. However, in dehydrogenative silylation, there is no addition reaction, and instead the aliphatic unsaturation is vinylically bonded to silicon. As such, dehydrogenative silylation reactions may be utilized to prepare unsaturated compounds (e.g. olefin functional compounds) which may further undergo additional functionalization and/or coupling reactions (e.g. via hydrosilylation).

Unfortunately, catalysts for dehydrogenative silylation reactions suffer many of the same drawbacks associated with hydrosilylation catalysts, such as sensitivity to oxygen, water, and even light. Moreover, while such drawbacks have been overcome with recent advances in hydrosilylation catalyst, many catalytic systems suitable for hydrosilylation reactions are not practical for use in dehydrogenative silylation reactions. For example, many such catalysts exhibit selectivity favoring the addition reaction, especially for minimally substituted olefins, thus leading to unselective reactions with undesirable product mixtures and low yields. Additionally, many conventional dehydrogenative silylation conditions are not functional group tolerant, and thus are limited in application.

BRIEF SUMMARY

The present disclosure provides a method of preparing catalyst particles (the "preparation method"). The preparation method comprises combining a Ru(0) complex and a carrier fluid to form a mixture, and heating the mixture at an elevated temperature to nucleate the Ru(0) complex and give the catalyst particles in the carrier fluid. The Ru(0) complex may comprise a triruthenium complex or a derivative thereof, a phosphorous ligand, or combinations thereof The preparation method optionally comprises isolating the catalyst particles from the carrier fluid.

The present disclosure also provides a method of preparing an organosilicon compound with the catalyst particles (the "synthesis method"). The synthesis method comprises reacting via dehydrogenative coupling (A) an organohydridochlorosilane compound and (B) an alkene compound in the presence of (C) a catalyst comprising the catalyst particles, thereby preparing the organosilicon compound. The organohydridochlorosilane compound (A) may have the general formula $HSiCl_xR_{3-x}$, where subscript x is 1 or 2 and each R is an independently selected unsubstituted hydrocarbyl group having from 1 to 18 carbon atoms, the alkene compound (B) may have the formula $R^1CHCH_2$, where $R^1$ is H or a hydrocarbyl group, and the organosilicon compound may have the general formula $(R^1 CHCH)SiCl_xR_{3-x}$, where subscript x, R, and $R^1$ are as defined above.

DETAILED DESCRIPTION

A method of preparing catalyst particles (the "preparation method") is provided. The catalyst particles may be utilized at least in dehydrogenative silylation/coupling reactions, and exhibit high conversion rates, selectivity, and yields. The catalyst particles have excellent physical properties, and may be used in various heterogeneous and/or homogeneous conditions, providing wide applicability. Given the diverse end use applications of the catalyst particles, as well as the catalytic activity thereof, a method of preparing an organosilicon compound with the catalyst particles (i.e., via dehydrogenative silylation reaction) is also provided, and described in further detail below.

The preparation method comprises combining a Ru(0) complex and a carrier fluid to form a mixture, and heating the mixture at an elevated temperature to give particles comprising the Ru(0) complex (i.e., the "catalyst particles"). As will be appreciated from the description below, the preparation method prepares the catalyst particles in a heterogeneous composition comprising the catalyst particles and the carrier fluid. As such, the preparation method may further comprise additional steps, such as isolating the catalyst particles from the carrier fluid, purifying the catalyst particles, etc., as described below.

As introduced above, the preparation method utilizes a Ru(0) complex, i.e., a complex comprising ruthenium (Ru) in a neutral oxidation state. The Ru(0) complex is not particularly limited, and may be any Ru(0) complex capable of forming particles and catalyzing a dehydrogenative silylation reaction, in accordance with the methods described herein.

Examples of suitable Ru(0) complexes include $\{Ru(\eta^4\text{-}1,5\text{-COD})(\eta^6\text{-}1,3,5\text{-COT})\}$; $\{Ru(PPh_3)_3(CO_2)\}$; $\{Ru(\eta^4\text{-}1,5\text{-COD})(\eta^6\text{-triphenylene})\}$; $\{[Ru(\eta^4\text{-}1,5\text{-COD})]_2(\eta^{12}\text{-triphenylene})\}$; $\{Ru(\eta^4\text{-}1,5\text{-COD})(\eta^4\text{-}1,3\text{-COT})PR'_3\}$; $\{Ru(\eta^6\text{-}1,3,5\text{-COT})PR'_3\}$; $\{Ru(\eta^4\text{-}1,5\text{-COD})(PR'_3)_3\}$; $\{Ru(\eta^4\text{-}1,5\text{-COD})(tBuNC)_3\}$; $\{[Ru(\eta^4\text{-}1,5\text{-COD})]_3(\eta^{18}\text{-triphenylene})\}$; $[Ru_3(CO)_{10}(MeCN)_2]$; $Ru_3(CO)_{12}$; and the like, as well as derivatives, modifications, and combinations thereof. One of skill in the art will appreciate that ligands represented by COD and COT at cyclooctadiene and cyclooctatriene, respectively. Ligands represented by general formula $PR'_3$ are tertiary phosphorous compounds (e.g. phosphines, phosphites, etc.), where each R' is an independently selected hydrocarbyl group, as exemplified by those described below with respect to variable substituent R. As but limited examples, each R' may be independently selected from substituted or unsubstituted alkyl groups, aryl groups, aralkyl groups, cycloalkyl groups, and combinations thereof, as exemplified by those described herein.

In certain embodiments, the Ru(0) complex comprises a triruthenium complex or a derivative thereof. Examples of triruthenium complexes include $\{[Ru(bda)\text{-}(pic)_2(\mu\text{-}O)]_2Ru(pic)_2(H_2O)_2\}^{2+}$; $\{[Ru_3(\mu\text{-}H)(\mu\text{-}\eta^3\text{-}dpa\text{-}C,N,N)(CO)_9]\}$; $\{(Ru(acac)_2)_3(\text{diquinoxaline}[2,3\text{-}a\text{:}2',3'\text{-}c]\text{phenazine})\}$; $\{[Cp^*Ru(\mu\text{-}H)]_3(\mu_3\text{-}\eta^2\text{-}(II)\text{-}PhCCH)(\mu_3\text{-}BH)\}$; $[Ru_3(dmbpy)_6(\mu\text{-}HAT)]^{6+}$; $\{[Ru(\eta^4\text{-}1,5\text{-}COD)]_3(\eta^{18}\text{-}triphenylene)\}$; $[Ru_3(CO)_{10}(MeCN)_2]$; $Ru_3(CO)_{12}$; and the like, as well as derivatives, modifications, and combinations thereof. One of skill in the art will appreciate that ligands represented by bda, pic, dpa, acac, Cp*, dmbpy, and HAT are 2,2-bipyridine-6,6-dicarboxylate, 2-picolylamine, dipicolylamine, acetylacetonate, 1,2,3,4,5-pentamethylcyclopentadienyl, 4,4'-dimethyl-2,2'-bipyridine, and 1,4,5,8,9,12-hexaazatriphenylene, or deprotonated forms thereof, respectively.

Examples of derivatives/modifications of Ru(0) complexes generally include ligand-exchanged versions of the complexes above. For example, derivatives of $Ru_3(CO)_{12}$ may be prepared via ligand exchange of CO with a phosphorus ligand, amine ligand, etc. Accordingly, in particular embodiments, the Ru(0) complex comprises, alternatively is, triruthenium dodecacarbonyl (i.e., of formula $Ru_3(CO)_{12}$) or a derivative thereof. In some such embodiments, the triruthenium dodecacarbonyl derivatives are further defined as ligand-exchanged derivatives of triruthenium dodecacarbonyl having one or more phosphorous ligands and/or one or more amine ligands, such as those described below. It is to be appreciated that such ligand-exchanged derivatives may also be prepared from ruthenium compounds/complexes other than triruthenium dodecacarbonyl, and are encompassed by the scope of the Ru(0) complex herein regardless if prepared or otherwise obtained from triruthenium dodecacarbonyl or another ruthenium compound/complex.

Accordingly, as will be appreciated from the exemplary complexes above, and the further description and examples below, the Ru(0) complex may comprise a phosphorous ligand. Examples of phosphorous ligands include phosphines, phosphites, phosphates, phosphine oxides, phosphoramidites, phosphinium salts, phosphinoamines, chlorophosphines, phosphinoimines, phosphorodiamidites, phosphinites, phosphonates, phosphonites, triaminophosphines, trisilylphosphines, and the like, as well as derivatives, modifications, and combinations thereof. One of skill in the art will appreciate that such ligands may be utilized in an ionic form (e.g. from protonation/deprotonation), which are encompassed by the examples and illustrated in various embodiments herein. Specific examples of phosphorous ligands include phosphine, trimethylphosphine, triphenylphosphine, methyldiphenylphosphine, trifluorophosphine, trimethylphosphite, triphenylphosphite, tricyclohexylphosphine, dimethylphosphinomethane (dmpm), dimethylphosphinoethane (dmpe), diphenylphosphinomethane (dppm), diphenylphosphinoethane (dppe), S,S-chiraphos, ethane-1,2-diylbis[(2-methoxyphenyl)phenylphosphane] (DIPAMP), 1,1'-bis(diphenylphosphino)ferrocene (dppf), tri(orthotolyl)phosphine, (2,4,6-triisopropylphenyl) dicyclopentylphosphine, and the like, as well as derivatives, modifications, and combinations thereof. One of skill in the art will appreciate that such phosphorous ligands include the phosphite versions of the phosphines above, as well as homosubstituted and heterosubstituted phosphines and phosphites having any one or more of the phosphorous bonded groups exemplified herein.

For example, in certain embodiments, the Ru(0) complex comprises a phosphorous ligand having the general formula $PR''_3$, where each R'' is independently of formula —R' or —OR', and each R' is as defined above (i.e., an independently selected hydrocarbyl group, as exemplified by those described below with respect to variable substituent R). As but limited examples in this particular context, each R' may be independently selected from substituted or unsubstituted alkyl groups, aryl groups, aralkyl groups, cycloalkyl groups, and combinations thereof, as exemplified by those described herein. In certain embodiments, each R' is independently a branched or cyclic hydrocarbyl group. For example, each R' may be independently selected from isopropyl groups, isobutyl groups, t-butyl groups, other branched alkyl groups, aryl groups, alkaryl groups, aralkyl groups, substituted aryl groups (e.g. pentafluorophenyl, etc.), and the like. As will be appreciated by those of skill in the art, each R'' (including the particular R' thereof) may be independently selected based on a factor such as steric hindrance, electronics (e.g. electron donative, inductive, or withdrawing effects, such as when R'' is of formula —OR'), and the like, or combinations thereof. For example, each R' may be selected to impart chirality or to impart symmetry to the catalyst. In these or other embodiments, R' may be independently selected to enforce reactive regioselectivity of the catalyst particles prepared, such as anti-Markovnikov selectivity. As such, each R'' (including the particular R' thereof) in the phosphorous ligand may be the same as or different from any other R'' in the phosphorous ligand.

In certain embodiments, each R'' has formula —R', such that the phosphorous ligand may be further defined as an organophosphine ligand. In some such embodiments, each R' is an independently selected substituted or unsubstituted aryl group, aralkyl group, or cycloalkyl group. Examples of such organophosphine ligands include substituted and unsubstituted triarylphosphines, tricycloalkylphosphine, bis (diarylphosphino)alkanes, bis(dicycloalkylphosphino)alkanes, and combinations thereof. In other such embodiments, at least one R' is a phosphorous-containing (i.e., substituted) hydrocarbyl group, such that the phosphorous ligand is a polydentate ligand having more than one phosphorous atom. Specific examples of such phosphorous ligands include 1,3-bis(dicyclohexylphosphino)propane and 1,3-bis(diphenylphosphino)propane.

In specific embodiments, each R'' has formula —OR', such that the phosphorous ligand may be further defined as an organophosphite ligand. In such embodiments, each R' is generally as described above, and may independently comprise, or be, any of the specific groups described with respect to R' of the organophosphine ligand. Particular examples of organophosphate ligands include those where each R' is an aryl group, i.e., where the organophosphite ligand may be further defined as a triarylphosphite ligand (e.g. triphenylphosphite).

Additional examples of suitable phosphorous ligands include those having an intermediate Tolman Electronic Parameter (TEP) and/or an intermediate Tolman Cone Angle (TCA). For example, in some embodiments, the Ru(0) complex of the catalyst (C) comprises a phosphorous ligand having a TEP of from 2,050 to 2,100 cm$^{-1}$, such as from 2,060 to 2,090, alternatively from 2,065 to 2,085 cm$^{-1}$. In these or other embodiments, the Ru(0) complex comprises a phosphorous ligand having a TCA of from 100 to 200°, such as from 115 to 185°, alternatively from 130 to 170°. As will be understood by those of skill in the art, the TEP of a phosphorous ligand is based on the $A_1$-symmetrical CO stretching frequency ($\omega$) of a standard nickel tricarbonyl complex including the ligand (i.e., of formula $(R'_3P)Ni(CO)_3$, where ligand $PR'_3$ is the phosphorous ligand, and is as defined above), and may be determined from measuring the vibrational spectra (i.e., infrared (IR) or Raman) of the complex according to the relationship: TEP=$\omega$(CO, Ni; $A_1$)=2056.1+pL, where pL is the ligand-specific increment to the CO stretching frequency ($\omega$). Typically, $P(tBu)_3$ is utilized as a reference, with $pL(P(tBu)_3)$ set to 0 such that $\omega$(CO, A1)=2056.1 $cm^{-1}$. As will also be understood by those of skill in the art, the TCA of a phosphorous ligand in a transition metal complex is the solid angle formed with the metal at a vertex and outermost edge/perimeter of a cone minimally sized about the van der Waals spheres of the ligand atoms, and may be determined using computational space-filling models and/or empirical bond characterization. Methods and materials for such determinations of TEP and/or TCA are set forth in greater detail in Tolman, Chemical Reviews, 1977, vol 77 (3) pp 313-348, the characterization methods and phosphorous ligands of which are hereby incorporated by reference herein.

As introduced above, in certain embodiments, the Ru(0) complex comprises a nitrogen ligand. Examples of suitable nitrogen ligands generally include tertiary amines, secondary imines, and the like (e.g. neutral tri-substituted/bonded nitrogen compounds with a free lone pair on the nitrogen atom), as well as combinations thereof (e.g. substituted amide imines (i.e., amidines), such as 1,8-diazabicyclo[5.4.0]undec-7-ene (DBU)). Such nitrogen ligands are exemplified by triorganoamines, pyridines, bipyridines, quinolines, phenanthrolines, and the like, as well as combinations thereof. Example of triorganoamines include those of formula $NR'_3$, where R' is as described above (i.e., an independently selected hydrocarbyl group, as exemplified by those described below with respect to variable substituent R). As but limited examples in this particular context, each R' may be independently selected from substituted or unsubstituted alkyl groups, aryl groups, aralkyl groups, cycloalkyl groups, and combinations thereof, as exemplified by those described herein.

The Ru(0) complex may comprise other ligands aside from those set forth above, such as those comprising and/or derived from ketones, diones, olefins, nitriles, carbenes, and the like, as well as combinations thereof. Additional ligands may be prepared and/or exchanged with those of the Ru(0) complex in situ (i.e., during the preparation method), such as via solvent exchange.

The Ru(0) complex utilized in the preparation method may be prepared or otherwise obtained (i.e., as a prepared compound/complex). Methods of preparing many of the Ru(0) complexes described above are known in the art, and may be utilized with known compounds to prepare the ligand exchanged derivatives also described above, e.g. using compounds that are commercially available from various suppliers.

In certain embodiments, the Ru(0) complex is prepared as part of the preparation method, i.e., the preparation method comprises preparing the Ru(0) complex. In such embodiments, the Ru(0) complex may be prepared prior to combination with the carrier fluid or in situ, i.e., prepared in the carrier fluid via reaction/complexation, etc. of components disposed therein. Typically, preparing the Ru(0) complex comprises combining a catalyst precursor compound and a ligand precursor compound, optionally in the presence of a carrier vehicle, to give the Ru(0) complex (e.g. via ligand exchange), which may be combined directly with the carrier fluid, or, alternatively, may be purified, processed, combined with another carrier vehicle, or otherwise modified, prior to being combined with the carrier fluid or otherwise utilized to prepare the catalyst particles. It will be appreciated that preparing the Ru(0) complex may comprise any number of additional steps/processes/procedures not set forth in additional detail below, such as oxidizing or reducing a ruthenium complex/compound having a different oxidation state to give a Ru(0) complex.

Examples of catalyst precursor compounds generally include Ru(0) complexes and triruthenium complexes, including those described above, as well as derivatives, modifications, and combinations thereof. For example, in certain embodiments the catalyst precursor compound is triruthenium dodecacarbonyl. Examples of ligand precursor compounds include those suitable for preparing phosphorous and nitrogen ligands described above, including protonated and/or salt forms thereof. For example, in certain embodiments the ligand precursor compound is a tertiary phosphorous compound. In some such embodiments, the tertiary phosphorous compound is an organophosphine compound having formula $P(R')_3$, where R' is as defined above. Examples of such organophosphine compounds include triarylphosphines, tricycloalkylphosphines bis(diarylphosphino)alkanes, and bis(dicycloalkylphosphino)alkanes. In other such embodiments, the tertiary phosphorous compound is an organophosphite compound having formula $P(OR')_3$, where R' is as defined above. Examples of such organophosphite compounds include triarylphosphites. In other embodiments, the ligand precursor compound is a tertiary amine compound, such as an organoamine compound having formula $N(R')_3$, where R' is as defined above.

The catalyst and ligand precursor compounds may be provided, prepared, or otherwise obtained (e.g. from commercial sources). In certain embodiments, preparing the Ru(0) complex further comprises preparing the catalyst and/or ligand precursor compounds prior to and/or in conjunction with complexing ruthenium of the catalyst precursor compound with the ligand precursor compound to give the Ru(0) complex. As understood in the art, the catalyst and ligand precursor compounds can be prepared or synthesized via numerous paths and/or techniques.

The amounts of catalyst and ligand precursor compounds utilized to prepare the Ru(0) complex may vary, and will be selected by those of skill in the art, e.g. based on the amount of ruthenium metal present in the catalyst precursor compound, the ligands thereof, the solvent/carrier vehicle being utilized (if any), the number of electrons and/or lone pairs available to bind/coordinate with the ruthenium metal of the catalyst precursor compound, etc. For example, the ligand precursor compound may be utilized in an amount to provide a molar ratio of ligand (L) to ruthenium metal in the catalyst precursor compound (Ru) of from 1:10 to 100:1 (L:Ru) (i.e., 0.1-100 equivalents (eq.)), such as from 1:1 to 10:1 (i.e., 1-10 eq.), alternatively from 2:1 to 4:1 (i.e., 2-4 eq.). Amounts outside these ranges may also be utilized.

As introduced above, the Ru(0) complex may be prepared in a carrier vehicle, such as any of those described herein. For example, the Ru(0) complex may be prepared in the carrier fluid utilized in the preparation method, or a vehicle/solvent miscible therewith. In certain embodiments, the Ru(0) complex is prepared in the presence of an aromatic solvent (e.g. an aromatic organic solvent), such as benzene, toluene, xylene (e.g. o-, m-, and/or p-xylene), mesitylene (i.e., 1,3,5-trimethyl benzene), and the like, or combinations thereof. Depending on various selections, when the Ru(0) complex is prepared and/or disposed in the carrier vehicle or solvent, the vehicle or solvent, or a moiety thereof, may complex with the Ru(0), e.g. to become a ligand or other component of the Ru(0) complex.

Typically, the catalyst and ligand precursor compounds are combined in a vessel or reactor, along with any carrier/solvent utilized, to prepare the Ru(0) complex. The vessel or reactor may be heated or cooled in any suitable manner, e.g. via a jacket, mantle, exchanger, bath, coils, etc. For example, in some embodiments, the catalyst and ligand precursor compounds are combined in the aromatic solvent at an elevated temperature to give the Ru(0) complex. The elevated temperature for preparing the Ru(0) complex will be selected and controlled depending on the particular catalyst and/or ligand precursor compounds selected, the particular aromatic solvent and/or other carrier vehicle(s) utilized, the reaction vessel selected (e.g. whether open to ambient pressure, sealed, under reduced pressure, etc.), etc. Accordingly, the elevated temperature for preparing the Ru(0) complex will be selected by one of skill in the art in view of the reaction conditions and parameters selected and the description herein. The elevated temperature for preparing the Ru(0) complex is typically from greater than ambient temperature to 300° C., such as from 50 to 250, alternatively from 60 to 200, alternatively from 70 to 175, alternatively from 75 to 150, alternatively from 80 to 125° C. Elevated temperatures outside these ranges may also be utilized.

As introduced above, the preparation method utilizes a carrier fluid, which is combined with the Ru(0) complex to prepare the mixture. The carrier fluid is not particularly limited, and may be, or comprise, a solvent, diluent, etc., or combinations thereof.

Examples of particular carrier fluids and components suitable for use therein are described below. However, it is to be appreciated that the particular solvents, carriers, diluents, etc. utilized in or as the carrier fluid, as well as the respective amounts thereof employed, will be independently selected by one of skill in the art, e.g. based on solubility of the Ru(0) complex, the catalyst and/or ligand precursor compounds (if utilized), and the catalyst particles being prepared. In certain embodiments, the Ru(0) complex is prepared in the carrier fluid via ligand exchange of the catalyst precursor compound with the ligand precursor compound. In such embodiments, the ligand exchange is typically carried out under homogeneous conditions (e.g. in a solution state), and the carrier fluid thus selected to dissolve one or both precursor compounds and/or the Ru(0) complex prepared therefrom. However, the ligand exchange may be conducted heterogeneously, e.g. with one or more components suspended, but not dissolved, in the carrier fluid. Likewise, the preparation of the catalyst particles may be carried out under homogeneous or heterogeneous conditions. For example, in certain embodiments the carrier fluid is selected to dissolve the Ru(0) complex and/or components thereof, but precipitate the catalyst particles prepared therein. In certain embodiments, the carrier fluid is selected to partially dissolve the catalyst particles, e.g. to precipitate only those catalyst particles that obtain a certain size. However, it will be appreciated that the carrier fluid may be selected to carry out one or more reactions/preparations in a solution, emulsion, suspension, slurry, biphasic mixture, or combinations thereof, as well as to carry out reactions/preparations in different states from any other.

Examples of carrier fluids suitable for use in the preparation method include solvents (e.g. organic solvents, etc.), oils, (e.g. organic oils, silicone oils, etc.), fluids (e.g. organic fluids, silicone fluids, etc.), and the like, and combinations thereof. Examples of the organic solvents include aromatic hydrocarbon solvents such as benzene, toluene, and xylene (e.g. o-, m-, and/or p-xylene), mesitylene (i.e., 1,3,5-trimethyl benzene), and the like, or combinations thereof. Additional examples of organic solvents include aliphatic hydrocarbons (e.g. heptane, hexane, octane, etc.), halogenated hydrocarbons (e.g. dichloromethane, 1,1,1-trichloroethane, chloroform, etc.), dimethyl sulfoxide, dimethyl formamide, acetonitrile, tetrahydrofuran, white spirits, mineral spirits, naphtha, n-methylpyrrolidone, and the like, as well as derivatives, modifications, and combination thereof. Examples of organic fluids typically include organic oils including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of organic fluids include aromatic hydrocarbons, aliphatic hydrocarbons (e.g. isododecane, isohexadecane, Isopar L ($C_{11}$-$C_{13}$), Isopar H ($C_{11}$-$C_{12}$), hydrogenated polydecene), alkyl halides, aromatic halides, and combinations thereof. Examples of silicone fluids typically include low viscosity and/or volatile siloxanes, such as low viscosity organopolysiloxanes, volatile siloxanes, (e.g. volatile methyl, ethyl, and/or methyl ethyl siloxanes, etc.), and the like, as well as combinations thereof. Exemplary silicone fluids typically have a viscosity at 25° C. in the range of 1 to 1,000 mm$^2$/sec. Specific examples of silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl {(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures (e.g. vapor pressures of from $5\times10^{-7}$ to $1.5\times10^{-6}$ m$^2$/s).

Other carriers may also be utilized in, or as, the carrier fluid aside from those above. For example, the carrier fluid may comprise, alternatively may be, an ionic liquid. Examples of ionic liquids include anion-cation combinations, where the anion is generally selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is generally selected from imidazolium-based cations, pyrrolidinium-based cations, pyridinium-based cations, lithium cation, and the like. However, combinations of multiple cations and anions may also be utilized. Specific examples of the ionic liquids include 1-butyl-1-methylpyrrolidinium bis(trifluoromethanesulfonyl)imide, 1-methyl-1-propylpyrrolidinium bis(trifluoromethanesulfonyl)imide, 3-methyl-1-propylpyridinium bis(trifluoromethanesulfonyl) imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl)imide, lithium bis(trifluoromethanesulfonyl)imide, and the like, as well as derivatives, modifications, and combinations thereof.

In certain embodiments, the carrier fluid comprises, alternatively is, an aromatic solvent. In some such embodiments, the carrier fluid comprises, alternatively is, an aromatic organic solvent, such as benzene, toluene, xylene, mesitylene, or the like, or a combination thereof.

The preparation method may utilize any amount the Ru(0) complex and the carrier fluid. More specifically, the mixture may comprise the Ru(0) complex and carrier fluid in varying amounts or ratios contingent on desired properties of the particle formation (e.g. nucleation temperature, formation rate, etc.) and/or characteristics of the Ru(0) complex and/or carrier fluid employed.

Typically, the Ru(0) complex is utilized in an amount sufficient to provide a loading (wt./wt.) of at least 0.01 wt. % in the carrier fluid. Likewise, the Ru(0) complex is utilized in an amount sufficient to provide a loading less than the solubility limit of the Ru(0) complex, such that the mixture may be formed as a solution (e.g. at room temperature or with gentle heating). In certain embodiments, the Ru(0) complex is utilized in an amount of from 0.01 to 25, alternatively from 0.01 to 20, alternatively from 0.01 to 15, alternatively from 0.01 to 10, alternatively from 0.01 to 5, alternatively from 0.01 to 2.5, alternatively from 0.01 to 1, alternatively from 0.01 to 0.5 wt. %, based on the weight of the carrier fluid utilized. Higher or lower ratios may also be utilized. In particular, one of skill in the art will appreciate that a higher concentration (i.e., an increased loading) of the Ru(0) complex in the carrier fluid may increase the growth rate of the catalyst particles. Likewise, it will also be appreciated that the amount of carrier fluid utilized to prepare the mixture is a function of scale and the particular components utilized. For example, a greater amount of carrier fluid will be utilized to prepare the mixture when the Ru(0) complex is less soluble in the carrier fluid selected, as compared to preparing the mixture with a Ru(0) complex exhibiting higher solubility in the carrier fluid.

Typically, Ru(0) complex and the carrier fluid are combined in a vessel or reactor to prepare the mixture. The vessel or reactor may be heated or cooled in any suitable manner, e.g. via a jacket, mantle, exchanger, bath, coils, etc. As will be appreciated by those of skill in the art, the vessel or reactor is typically heated in a controllable fashion, such that the mixture may be heated to the elevated temperature without substantial overheating.

The Ru(0) complex and the carrier fluid may be fed together or separately to the vessel, or may be disposed in the vessel in any order of addition, and in any combination depending on the particular parameters of the preparation method employed. For example, in certain embodiments, the Ru(0) complex is added to a vessel containing the carrier fluid, e.g. as a premade complex or as individual components (i.e., precursor compounds) to form the Ru(0) complex in situ. In some such embodiments the carrier fluid is added in the vessel, which is then charged with the catalyst and ligand precursor compounds to form the Ru(0) complex. The catalyst and ligand precursor compounds may be first combined prior to the addition, or may be added to the vessel sequentially. In other embodiments, the carrier fluid is added to a vessel containing the Ru(0) complex, or components thereof, optionally in a solvent/carrier vehicle. In general, reference to the "mixture" herein refers generally to a mixture comprising the Ru(0) complex and the carrier fluid (e.g. as obtained by combining such components, as described above).

The method may further comprise agitating the mixture. The agitating may enhance mixing and contacting of the Ru(0) complex and/or particles thereof in the carrier fluid. Such agitation may also enhance mixing and contacting of the catalyst and ligand precursor compounds to form the Ru(0) complex, e.g. when the Ru(0) complex is formed in situ or otherwise as part of the preparation method. Such contacting independently may use other conditions, with (e.g. concurrently or sequentially) or without (i.e., independent from, alternatively in place of) the agitating.

As introduced above, the preparation method includes heating the mixture at an elevated temperature to give the catalyst particles. The elevated temperature is not particularly limited, and will be selected based on the loading of the Ru(0) complex, the type of Ru(0) complex utilized (e.g. the particular catalyst and ligand precursor compounds utilized, when the Ru(0) complex is prepared as part of the preparation method), etc. In general, the elevated temperature is selected to nucleate the Ru(0) complex. However, it will be appreciated that particle formation may include nucleation, flocculation, etc., as well as various phases thereof (e.g. primary nucleation, secondary nucleation, etc.), as will be understood by those of skill in the art. As such, it is to be understood that, in terms of preparing the catalyst particles, the elevated temperature is typically selected to facilitate primary nucleation (i.e., formation of a first nucleus from which particles may form) and/or secondary nucleation (i.e., formation of particles from a first nucleus comprising the Ru(0) complex) of the Ru(0) complex. Typically, the elevated temperature is from 70 to 250° C. For example, in certain embodiments, the elevated temperature is from 80 to 200° C., such as from 90 to 200, alternatively from 90 to 190, alternatively from 100 to 190, alternatively from 100 to 180, alternatively from 110 to 180, alternatively from 120 to 180, alternatively from 120 to 170, alternatively from 130 to 170, alternatively from 130 to 160, alternatively from 140 to 160° C. Elevated temperatures outside these ranges may also be utilized.

In certain embodiments, heating the mixture at an elevated temperature comprises multiple heating steps, e.g. at multiple different elevated temperatures. For example, the mixture may be heated step-wise to one or more target temperatures, which may be preselected or chosen in real-time during the preparation method (e.g. based on formation of particles, an observed property of the mixture such as opacity, etc.). In certain embodiments, step-wise heating is utilized to heat a combination of the catalyst and ligand precursor compounds in the carrier fluid to a first elevated temperature to prepare the Ru(0) complex in the carrier fluid (i.e., to give the mixture), and then to heat the mixture to a second elevated temperature to give the catalyst particles.

The time during which the mixture is heated to prepare the catalyst particles is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 1 to 48, alternatively from 1 to 36, alternatively from 1 to 24, alternatively from 1 to 12, alternatively from 1 to 6 hours, as will be readily determined by one of skill in the art (e.g. by monitoring formation of the catalyst particles via chromatographic and/or spectroscopic methods). In certain embodiments, the time during which the particles are formed is from greater than 0 to 2 hours, such as from 5 minutes to 2 hours, alternatively from 10 minutes to 1 hour, alternatively from 10 to 45 minutes, alternatively from 10 to 30 minutes, after reaching the elevated temperature.

Particle growth rates, sizes, and dispersibility may be controlled through the choice of the particular Ru(0) complex selected. More specifically, the ligands of the Ru(0) complex will influence the solubility, nucleation, flocculation, etc. of the Ru(0) complex in the carrier fluid selected. As such, the preparation method may comprise selectively controlling the average particle size of the catalyst particles, e.g. via selection of the Ru(0) complex, carrier fluid, elevated temperature, and/or heating period (i.e., the time during which the mixture is held at the elevated temperature).

For example, the mixture may comprise a support material on which the Ru(0) complex may nucleate. Such materials are exemplified by the solid carriers described below. Typically, however, the mixture is free from any support material on which the Ru(0) complex nucleates. As such, in certain embodiments, the catalyst particles are free from such as a support material.

In general, heating the mixture at the elevated temperature prepares a product mixture comprising the catalyst particles, the carrier fluid, as well as compounds in combination therewith (e.g. remaining Ru(0) complex, catalyst and/or ligand precursor compounds, if utilized, etc.).

In certain embodiments, the preparation method includes isolating the catalyst particles from the product mixture. As used herein, isolating the catalyst particles is typically defined as increasing the relative concentration of the catalyst particles as compared to carrier fluid and compounds in combination therewith (e.g. remaining Ru(0) complex, catalyst and/or ligand precursor compounds, if utilized, etc.). As such, isolating may comprise removing the catalyst particles from the carrier fluid and/or removing the carrier fluid (i.e., partially or entirely) from the catalyst particles. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the catalyst particles.

In some embodiments, the preparation method further includes purifying the catalyst particles. Purifying the catalyst particles may comprise one or more of the same techniques utilized for isolating the catalyst particles from the carrier fluid, as well as alternative and/or additional techniques as compared to those utilized in isolating the catalyst particles. Regardless of the particular technique(s) selected, isolation and/or purification of catalyst particles may be performed in sequence (i.e., in line) with formation of the catalyst particles, and thus may be automated. In other instances, purification may be a stand-alone procedure to which the mixture of catalyst particles in the carrier fluid is subjected. In certain embodiments, purifying the catalyst particles comprises size-selecting certain particles, i.e., decreasing/reducing/narrowing the particle-side distribution of the catalyst particles (i.e., by removing small particles therefrom during purification).

In certain embodiments, the catalyst particles precipitate from the carrier fluid, and isolating the catalyst particles from the product mixture comprises filtering the catalyst particles from the carrier fluid. In some embodiments, the catalyst particles are suspended in the carrier fluid (e.g. as a colloid), and isolating the catalyst particles from the product mixture comprises centrifuging the product mixture to give a sediment comprising the catalyst particles and a supernatant comprising the carrier fluid, and then separating the sediment from the supernatant, thereby isolating the catalyst particles. In some such embodiments, the isolated catalyst particles are purified and/or size selected via washing and differential centrifugation. More specifically, the method may comprise washing the isolated catalyst particles by suspending the same in a washing solvent (e.g. such as those utilized in/as the carrier fluid, or similar such solvents), and centrifuging the resulting suspension to sediment the washed catalyst particles from the washing solvent, which is removed therefrom as supernatant. The particular washing solvent may be selected to size-select the catalyst particles (e.g. via the solubility/insolubility of certain sized catalyst particles therein). Likewise, the method may comprise repeating the washing/differential centrifugation process any number of times to further purify and/or size-select the catalyst particles.

The preparation method prepares catalyst particles. More specifically, as will be understood in view of the description of the mixture and the parameters of the preparation method, the method prepares catalyst particles from the Ru(0) complex (i.e., Ru(0) catalyst particles). As such, the particular particles prepared are a function of the Ru(0) complex utilized, and may comprise any of the features described above with respect to the Ru(0) complex itself (e.g. in terms of ruthenium content, ligand type and/or structure, etc.

In certain embodiments, the catalyst particles may comprise an average particle diameter of from 1 nm to 100 μm, such as from 10 nm to 100 μm, alternatively from 100 nm to 100 μm, alternatively from 100 nm to 100 μm, alternatively from 250 nm to 100 μm, alternatively from 500 nm to 100 μm, alternatively from 750 nm to 100 μm, alternatively from 1 to 100 μm. In some embodiments, the catalyst particles may comprise an average particle diameter of from 100 nm to 50 μm, such as from 100 nm to 25 μm, alternatively from 250 nm to 20 μm, alternatively from 500 nm to 15 μm, alternatively from 750 nm to 10 μm, alternatively from 1 to 10 μm.

As introduced above, the catalyst particles are prepared in the product mixture comprising the carrier fluid, but may be isolated and/or purified. As such, the catalyst particles may be disposed in a fluid or carrier (i.e., a carrier vehicle, solvent, etc., such as those described herein), such as the carrier fluid utilized in the preparation method, or may alternatively be free from, alternatively substantially free from any carrier vehicle or solvent. Likewise, the catalyst particles may be disposed in or on a solid carrier. Examples of such solid carriers include activated carbons, silicas, silica aluminas, aluminas, zeolites and other inorganic powders/particles (e.g. sodium sulphate), and the like. In certain embodiments, however, the catalyst particles are free from, alternatively substantially free from, solid carriers or other such support materials.

As introduced above, the catalyst particles prepared in accordance with the preparation method may be utilized to catalyze coupling reactions and, in particular, dehydrogenative silylation reactions. As such, a method of preparing an organosilicon compound (the "synthesis method") with the catalyst particles is provided herein. As will be understood in view of the description of the synthesis method herein, the organosilicon compound prepared is alkenyl or vinyl-functional, and is thus useful in compositions and methods for preparing and/or crosslinking curable compositions, as well as various components thereof, such as those based on one or more silicones, e.g. as a starting material, reagent, building block, functionalizing compound, etc.

The synthesis method includes reacting (A) an organohydridochlorosilane compound and (B) an alkene compound in the presence of (C) a catalyst comprising the catalyst particles described above, thereby preparing the organosilicon compound. As will be appreciated from the description below, the synthesis method prepares the organosilicon compound and molecular hydrogen ($H_2$) via a dehydrogenative coupling reaction of (A) and (B) (i.e., a dehydrogenative silylation of the alkene compound (B) with the organohydridochlorosilane compound (A)), as catalyzed by the catalyst (C) (the "reaction").

The organohydridochlorosilane compound (A), alkene compound (B), and the catalyst (C) are described in turn below, along with additional components that may be utilized in the synthesis method, which may be collectively referred to herein as the "components" of the synthesis method (i.e., "component (A)", "component (B)", "component (C)", etc., respectively.) or, additionally, as "starting material(s)", "compound(s)", and/or "reagent(s)" (A), (B), and/or (C), etc., or likewise, by function and/or functionality as "hydridosilane (A)", "alkene (B)", and/or "catalyst (C)", as will be readily understood by those of skill in the art.

As introduced above, component (A) is an organohydridochlorosilane compound, i.e., an organosilicon compound having at least one silicon-bonded hydrogen atom (i.e., a Si—H group), and at least one silicon-bonded chlorine atom (i.e., a Si—Cl group). The organohydridochlorosilane compound (A) is not otherwise particularly limited.

In certain embodiments, the organohydridochlorosilane compound (A) has the general formula $HSiCl_xR_{3-x}$, where subscript x is 1 or 2 and each R is an independently selected hydrocarbyl group. For example, in some such embodiments, subscript x is 1, such that the organohydridochlorosilane compound (A) is further defined as a diorganohydridochlorosilane having the formula $HSiClR_2$. In other such embodiments, subscript x is 2, such that the organohydridochlorosilane compound (A) is further defined as an organohydridodichlorosilane having the formula $HSiCl_2R$. Of course, it will be appreciated that mixtures of such organohydridodichlorosilanes may also be utilized, e.g. where subscript x is an average value of from 1 to 2.

With regard to the formulas of component (A) above, each R is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., R may include one or more heteroatoms (oxygen, sulfur, nitrogen, etc.) within a carbon chain), or both. As such, it will be appreciated that R may comprise, or be, a hydrocarbon moiety having one or more substituents in and/or on (i.e., appended to and/or integral with) a carbon chain/backbone thereof, such that R may comprise, or be, an ether, an ester, etc.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, as well as branched saturated hydrocarbon groups, e.g. having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each R is an independently selected substituted or unsubstituted hydrocarbyl group. For example, in some embodiments each R is independently selected from unsubstituted hydrocarbyl groups, such as linear or unbranched unsubstituted hydrocarbyl groups. Such linear or unbranched unsubstituted hydrocarbyl groups include those having from 1 to 20 carbon atoms, such as from 1 to 18, alternatively from 1 to 16, alternatively from 1 to 14, alternatively from 1 to 12, alternatively from 1 to 10, alternatively from 1 to 8, alternatively from 1 to 6 carbon atoms.

When subscript x is 1, such that the organohydridochlorosilane compound (A) is further defined as the diorganohydridochlorosilane, each R may be the same as or different from the other R in the organohydridochlorosilane compound (A). In certain embodiments, each R is the same as each other R in the organohydridochlorosilane compound (A). In other embodiments, one R is different from the other R of the organohydridochlorosilane compound (A). In some embodiments, each R is an independently selected hydrocarbyl group having from 1 to 18, alternatively from 1 to 12, alternatively from 1 to 6, carbon atoms. In some such embodiments, each hydrocarbyl group is unsubstituted. In certain embodiments, each R is independently selected from unsubstituted alkyl groups, such as methyl groups, ethyl groups, etc. In specific embodiments, each R is methyl. For example, in some such embodiments, the organohydridochlorosilane compound (A) has the formula $HSiCl_x(CH_3)_{3-x}$, where subscript x is as defined above. In certain such embodiments, component (A) comprises chlorodimethylsilane (i.e., of formula $HSiCl(CH_3)_2$), dichloromethylsilane (i.e., of formula $HSiCl_2CH_3$), or combinations thereof.

As introduced above, component (B) is an alkene compound. More specifically, the alkene compound (B) comprises at least one unsaturated aliphatic hydrocarbon group per molecule. The alkene compound (B) may comprise, alternatively may be, any unsaturated compound having at least one aliphatically unsaturated group, and is not otherwise particularly limited. As will be understood by those of skill in the art, the unsaturated aliphatic hydrocarbon group comprises a carbon-carbon (C=O) double bond, and may alternatively be referred to as an alkenyl group (or alkene), an olefin, aliphatic unsaturation, ethylenic unsaturation, etc., depending on the particular form of the hydrocarbon group having the unsaturation.

In certain embodiments, the alkene compound (B) comprises an organic compound. In other embodiments, the alkene compound (B) comprises a siloxane compound. In yet other embodiments, the alkene compound (B) comprises a silicon-organic hybrid and/or an organosilicon compound (i.e., where the alkene compound (B) comprises at least one organic segment comprising the unsaturated aliphatic hydrocarbon group, as well as at least one silicon segment comprising a silane and/or siloxane). Examples of the alkene compound (B) are illustrated by the embodiments and compounds described below.

In some embodiments, the alkene compound (B) comprises an alkenyl group. "Alkenyl group" means an acyclic, branched or unbranched, hydrocarbyl group (i.e., monovalent hydrocarbon group, when bonded to another group/moiety of the alkene compound (B)) having one or more carbon-carbon (C=O) double bonds. For example, the alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkenyl groups are exemplified by, but not limited to, vinyl, allyl, propenyl, and hexenyl. In certain embodiments, the alkene compound (B) includes an average of at least two unsaturated aliphatic hydrocarbon groups per molecule, which are each independently selected. The unsaturated aliphatic hydrocarbon of the alkene compound (B) may each be terminal or such that the alkene compound (B) may comprise terminal unsaturation, internal unsaturation, pendant unsaturation, or unsaturation in any combination of such locations.

In certain embodiments, the alkene compound (B) has the formula Z-A, where Z is selected from monovalent organic moieties, silicon moieties comprising a silane and/or siloxane group, and combinations thereof, and A is an alkenyl group. In other embodiments, the alkene compound (B) has the formula A-Z'-A, where each A is an independently selected alkenyl group and Z' is a divalent linking group. In such embodiments, the divalent linking group Z' is typically selected from organic moieties, silicon moieties comprising a silane and/or siloxane group, and combinations thereof.

In particular embodiments, the alkene compound (B) has the formula $R^1CHCH_2$, where $R^1$ is a hydrocarbyl group or H. Suitable hydrocarbyl groups include those described above with respect to variable substituent R. For example, $R^1$ may be substituted or unsubstituted, linear, branched, or cyclic, saturated or unsaturated, and, if unsaturated, unconjugated, conjugated, or aromatic, and combinations thereof. For example, in some embodiments, $R^1$ is selected from unsubstituted hydrocarbyl groups, such as linear or unbranched unsubstituted hydrocarbyl groups. Such linear or unbranched unsubstituted hydrocarbyl groups include those having from 1 to 16 carbon atoms, such as from 1 to 14, alternatively from 1 to 12, alternatively from 1 to 10, alternatively from 1 to 8, alternatively from 1 to 6, alternatively from 1 to 4, alternatively of 1, 2, or 3 carbon atoms. Examples of such compounds include linear alpha-olefins, such as propene, 1-butene, 1-heptene, 1-hexene, 1-octene, 1-nonene, 1-decene, 1-undecene 1-dodecene, 1-tridecene, 1-tetradecene, 1-pentadecene, 1-hexadecene, etc. In other embodiments, $R^1$ is selected from cyclic and/or aromatic hydrocarbyl groups. For example, in certain embodiments, $R^1$ is phenyl ($C_6H_5$), such that the alkene compound (B) is styrene. As such, it will also be appreciated that $R^1$ may comprise one or more unsaturated aliphatic groups, which may be internal, conjugated, etc., or combinations there (e.g. as when part of an aryl group).

In certain embodiments, $R^1$ is H, such that the alkene compound (B) is ethylene. In such embodiments, the ethylene is not limited, and may be used in neat form (i.e., free from, alternatively substantially free from other components/compounds). Said differently, component (B) may consist of, alternatively consist essentially of ethylene, or may comprise ethylene in combination with other components. For example, in some embodiments, the synthesis method includes introducing a reactor fluid comprising, alternatively consisting essentially of, alternatively consisting of, ethylene into a vessel or reactor comprising at least components (A) and (C). In such embodiments, the reactor fluid may comprise components other than the ethylene, such as a carrier vehicle, which, as will be understood by those of skill in the art, will typically be or comprise a substance that is inert under the reaction conditions utilized in the synthesis method (i.e., will not react with the components (A), (B), or (C)). Examples of such carrier vehicles include inert gasses such as nitrogen (g) ($N_2$), helium (g) (He), argon (g) (Ar), and the like, as well as combinations thereof.). In certain embodiments, however, component (B) is utilized in neat form, and consists essentially of ethylene (i.e., and is substantially free from, alternatively free from, a carrier vehicle).

Ethylene may be utilized in gaseous form in or as component (B). As such, it will be appreciated that, in certain embodiments, the synthesis method is carried out in a vessel, which may optionally be pressurized with ethylene (e.g. via a gas manifold). For example, the vessel may be pressurized with ethylene at a pressure that is greater than atmospheric pressure, which can further drive the reaction. In some embodiments, ethylene is employed at a pressure of from 100 to 200,000 kPa, such as from 100 to 20,000, alternatively from 100 to 10,000, alternatively from 100 to 5,000, alternatively from 100 to 2,000, alternatively from 100 to 1,000, alternatively from 250 to 1,000, alternatively from 250 to 750 kPa. Temperatures may be elevated in the vessel as well, as described below.

The synthesis method may utilize any amount of components (A) and (B) and, more specifically, may comprise the organohydridochlorosilane compound (A) and the alkene compound (B) in varying amounts or ratios contingent on desired properties of the reaction (e.g. conversion rates, etc.) and/or characteristics of the starting materials employed. Typically, component (B) is utilized in at least a 1:1 stoichiometric ratio based on the number of silicon-bonded hydrogen groups of component (A) to be vinylated (i.e., the number of Si—H groups capable of undergoing the dehydrogenative coupling reaction). As such, the amount of the alkene compound (B) is typically selected based on the amount, type, solubility, etc. of the organohydridochlorosilane compound (A), as will be understood by those of skill in the art. An excess, or gross excess, of alkene compound (B) may be utilized in order to maximize the degree of conversion of the organohydridochlorosilane compound (A) to the organosilicon compound. For example, components (A) and (B) may be utilized in a 1:1 stoichiometric ratio (A):(B). In certain embodiments, ethylene is utilized in an amount sufficient to provide a mole ratio of alkene compound (B) to organohydridochlorosilane compound (A) of from 1:1 to 100:1, such as from 1:1 to 50:1, alternatively from 1:1 to 25:1, alternatively from 1:1 to 20:1, alternatively from 1:1 to 15:1, alternatively from 1:1 to 10:1, alternatively from 2:1 to 10:1, alternatively from 2:1 to 6:1 (B):(A). Higher or lower ratios may also be utilized. For example, a gross excess of alkene compound (B) may be utilized (e.g. in a mole ratio of >100:1 (B):(A)), such as when the alkene compound (B) is in a gaseous form (e.g. as ethylene, propene, etc.), when utilized as a carrier vehicle in the reaction, etc.

As introduced above, component (C) comprises the Ru(0) complex-containing catalyst particles described above. The catalyst (C) is otherwise not particularly limited.

The particular catalyst particles may be selected based on the other components being utilized in the reaction of the synthesis method. In particular, the particular phosphorous ligand utilized in the Ru(0) complex to form the catalyst particles of the catalyst (C) may be selected based on the particular organohydridochlorosilane compound (A) utilized. For example, in certain embodiments, the organohydridochlorosilane compound (A) is the diorganohydridochlorosilane having the formula $HSiClR_2$, and the catalyst particles of the catalyst (C) comprise a Ru(0) complex having the organophosphine ligand. In other embodiments, the organohydridochlorosilane compound (A) is the organohydridodichlorosilane having the formula $HSiCl_2R$, and the Ru(0) complex of the catalyst (C) comprises the organophosphite ligand.

The catalyst particles may be utilized in any form, such as neat (i.e., absent solvents, carrier vehicles, diluents, etc.), or disposed in a carrier vehicle, such as a solvent or dispersant (e.g. such as any of those listed and/or described herein, including the carrier fluid utilized to prepare the catalyst particles), which will be independently selected by those of skill in the art (e.g. in view of the particular components (A) and (B) selected, the solubility of the catalyst particles, etc.). As such, in certain embodiments, component (C) consists essentially of, alternatively consists of, the catalyst particles. In other embodiments, component (C) may comprise one or more additional components, such as when the catalyst particles are not isolated and/or purified, as described above. In some embodiments, component (C) may comprise a carrier vehicle, diluent, solvent, or other carrier, such as the carrier fluid utilized to prepare the catalyst particles.).

The catalyst (C) may be utilized in any amount, which will be selected by one of skill in the art, for example based on the particular catalyst particles selected (e.g. the concentration/amount of active Ru species thereof), the nature/type of components (A) and/or (B) selected, the reaction parameters employed, the scale of the reaction (e.g. total amounts of component (A) utilized, ratio of components (A):(B) utilized, etc.), etc. The molar ratio of the catalyst (C) to components (A) and/or (B) utilized in the reaction may influence the rate and/or amount of dehydrogenative coupling/silylation to prepare the organosilicon compound. Thus, the amount of the catalyst (C) as compared to components (A) and/or (B), as well as the molar ratios therebetween, may vary. Typically, these relative amounts and the molar ratio are selected to maximize the reaction of components (A) and (B) while minimizing the loading of the catalyst (C) (e.g. for increased economic efficiency of the reaction, increased ease of purification of the reaction product formed, etc.).

In certain embodiments, the catalyst (C) is utilized in an amount sufficient to provide the catalyst particles in an amount of from 0.000001 to 50 wt. %, based on the total amount of component (A) utilized (i.e., wt./wt.). For example, the catalyst (C) may be used in an amount sufficient to provide the catalyst particles in an amount of from 0.000001 to 25, alternatively from 0.00001 to 10, alternatively from 0.0001 to 5 wt. % based on the total amount of component (A) utilized. In some embodiments, the catalyst (C) is utilized in an amount sufficient to provide a ratio of Ru(0) complex in the catalyst particle to organohydridochlorosilane compound (A) of from 1:10 to 1:1,000,000, alternatively from 1:50 to 1:1,000 alternatively from 1:100 to 1:500 (C):(A). Such ratios may be a weight ratio (i.e., wt./wt. (C):(A), alternatively the active components thereof) or a molar ratio (C):(A), alternatively the active components thereof. It will be appreciated that amounts and ratios outside of the ranges listed above may be utilized as well. For example, the catalyst (C) may be utilized in a stoichiometric amount (i.e., a supracatalytic amount), e.g. based on the total amount of component (B) (i.e., the alkenyl group thereof) utilized in the synthesis method.

In certain embodiments, the synthesis method includes reacting components (A) and (B) (e.g. via dehydrogenative coupling/silylation) in the presence of (D) an olefin compound. In general, the olefin compound (D) comprises an unsaturated aliphatic hydrocarbon group, which may also be referred to as aliphatic unsaturation, ethylenic unsaturation, etc., depending on the particular form of the hydrocarbon group having the unsaturation (e.g. the C—C double and/or triple bond). When utilized, the olefin compound (D) is different from the alkene compound (B). The particular aliphatically unsaturated group and/or compound utilized in or as the olefin compound (D) is typically be selected based on hydrogenation and/or silylation rates. For example, in certain embodiments, the olefin compound (D) is selected to readily undergo hydrogenation, but undergo hydrosilylation slowly.

The aliphatically unsaturated group of the olefin compound (D) may be an alkenyl group and/or an alkynyl group. As will be understood by those of skill in the art, the term "alkenyl group" refers to a group having one or more carbon-carbon double bonds (e.g. an alkene), and the term "alkynyl group" refers to a group having one or more carbon-carbon triple bonds (e.g. an alkyne). Either of such groups may be cyclic or acyclic, branched or unbranched, substituted or unsubstituted, and combinations thereof. Such groups are not generally limited in terms of size and/or overall structure aside from the olefinic portion and, for example, may comprise from 2 to 30 carbon atoms, such as from 2 to 24 carbon atoms, alternatively from 2 to 20, alternatively from 2 to 12, alternatively from 2 to 10, alternatively from 2 to 6 carbon atoms. Particular alkenyl groups are exemplified by vinyl, vinylidine, allyl, propenyl, and hexenyl groups. Suitable alkenyl groups include internal, external, terminal (e.g. alpha-olefins), polysubstituted (e.g. cis and trans disubstituted, trisubstituted, and tetrasubstituted alkenes), and combinations thereof. Examples of particular alkynyl groups include ethynyl, propynyl, and butynyl groups. As will be appreciated from the description herein, the olefin compound (D) includes, per molecule, at least one aliphatically unsaturated group. However, in certain embodiments, the olefin compound (D) includes an average of at least two aliphatically unsaturated groups per molecule. Of course, the olefin compound (D) may comprise any number of additional aliphatically unsaturated groups as well. Each aliphatically unsaturated group of the olefin compound (D) may be terminal, pendent, or in both such locations in the olefin compound (D), e.g. depending on the structure thereof.

In certain embodiments, the olefin compound (D) comprises, alternatively is, an organic compound. In other embodiments, the olefin compound (D) comprises, alternatively is, a siloxane. In yet other embodiments, the olefin compound (D) comprises, alternatively is, a silicone-organic hybrid, or an organosilicon compound.

Examples of compounds suitable for use as the olefin compound (D) include of alkenyl compounds (e.g. compounds having at least one alkenyl group), such as butenes (e.g. isobutene, cyclobutene, etc.), pentenes (e.g. 4-methyl-1-pentene, 3-methyl-1-pentene, cyclopentene, 2-methylcyclopentene, 4-methylcyclopentene, etc.), hexenes (e.g. cyclohexene, 3,5,5-trimethyl-1-hexene, vinylcyclohexene, etc.), linear alpha-olefins (e.g. 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, etc.), cyclic olefins (e.g. cycloheptene, cyclooctene, cyclononene, cyclodecene, norbornene, 4-methylnorbornene, dicyclopentadiene, 5-ethylidene-2-norbornene, 5-vinyl-2-norbornene, vinylnorbornane, etc.) polyolefins (e.g. 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, 1,5-diallylcyclooctane, 1,3-divinylcyclopentane, dicyclopentadiene, norbornadiene, etc.), branched acyclic olefins (e.g. 5-methyl-1-nonene), olefin-substituted cyclic compounds (e.g. vinylcyclohexane, etc.), linear and cyclic alkyne compounds, diene compounds (e.g. 1,4-pentadiene, 1,5-hexadiene, 1,6-heptadiene, 1,7-octadiene, 1,8-nonadiene, 1,9-decadiene, 1,11-dodecadiene, 1,13-tetradecadiene, 1,19-eicosadiene, etc.), diyne and ene-yne compounds (e.g. 1,3-butadiyne, 1,5-hexadiyne, 1-hexene-5-yne, etc.), and the like, as well as derivatives, modifications, and combinations thereof. In certain embodiments, the olefin compound (D) comprises, alternatively consists essentially of, alternatively is, norbornene or a derivative or analog thereof.

The synthesis method may utilize any amount of component (D) and, more specifically, may comprise the olefin compound thereof in any amount and/or ratio contingent on desired properties of the reaction (e.g. conversion rates, etc.) and/or characteristics of the starting materials employed. Typically, component (D) is utilized in an amount sufficient to provide the olefin compound in at least a 1:1 stoichiometric ratio based on the number of silicon-bonded hydrogen groups of component (A) to be vinylated (i.e., the number of Si—H groups capable of undergoing the dehydrogenative coupling reaction). As such, the amount of component (D) is typically selected based on the amount and type of the organohydridochlorosilane compound (A), as will be understood by those of skill in the art. An excess, or gross excess, of component (D) may be utilized. For example, components (A) and (D) may be utilized in a 1:≥1 stoichiometric ratio (A):(D). In certain embodiments, component (D) is utilized in an amount sufficient to provide a mole ratio of the olefin compound to the organohydridochlorosilane compound (A) of from 1:1 to 100:1, such as from 1:1 to 10:1, alternatively from 2:1 to 10:1, alternatively from 3:1 to 5:1 (D):(A). Higher or lower ratios may also be utilized.

The components utilized in the synthesis method (i.e., the organohydridochlorosilane compound (A), the alkene compound (B), the catalyst (C), and/or the olefin compound (D) (when utilized)) may be provided "as is", i.e., ready for the reaction to prepare the organosilicon compound. Alternatively, any one or more, or all, of components (A), (B), (C), and or (D) may be formed prior to or during the reaction (e.g. such as where the method comprises preparing catalyst particles (C), as described above). In some embodiments, the synthesis method further comprises preparing the organohydridochlorosilane compound (A). In these or other embodiments, the synthesis method further comprises preparing the alkene compound (B). In these or other embodiments, the synthesis method further comprises preparing catalyst particles and or component (C) therefrom. In these or other embodiments, the synthesis method further comprises preparing the olefin compound (D).

Typically, components (A), (B), (C), and optionally (D), are reacted in a vessel or reactor to prepare the organosilicon compound. When the reaction is carried out at an elevated or reduced temperature as described below, the vessel or reactor may be heated or cooled in any suitable manner, e.g. via a jacket, mantle, exchanger, bath, coils, etc.

Components (A), (B), (C), and optionally (D), may be fed together or separately to the vessel, or may be disposed in the vessel in any order of addition, and in any combination. For example, in certain embodiments, components (A), (B), and (D) are added to a vessel containing component (C), e.g. as a premade catalyst composition comprising the catalyst particles, or as individual components to form the catalyst particles (C) in situ. For example, in certain embodiments the catalyst (C) is prepared in the vessel according to the preparation method above, and then charged with components (A), (B), and optionally (D). In some embodiments, components (A) and (D) may be first combined prior to the addition, or may be added to the vessel sequentially (e.g. (A) then (D)). In other embodiments, component (D) is added to a vessel containing components (A) and (C). In general, reference to the "reaction mixture" herein refers generally to a mixture comprising components (A), (B), (C), and optionally (D) if utilized, (e.g. as obtained by combining such components, as described above).

The method may further comprise agitating the reaction mixture. The agitating may enhance mixing and contacting together components (A), (B), (C), and optionally (D), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., dehydrogenative coupling), of the organohydridochlorosilane compound (A) and the alkene compound (B) to form the organosilicon compound. Other conditions may be result-effective conditions for enhancing reaction yield or minimizing amount of a particular reaction by-product included within the reaction product along with the organosilicon compound.

The components (A) and (B) may be reacted in the presence of carrier vehicle (e.g. a solvent, diluent, fluid, or combinations thereof), such that the reaction is carried out in a solution, emulsion, suspension, slurry, colloid, biphasic mixture, or combinations thereof. The particular solvents, carriers, and/or diluents utilized, and the respective amounts thereof employed, will be independently selected by one of skill in the art, e.g. based the particular organohydridochlorosilane compound (A), alkene compound (B), catalyst (C), and/or olefin compound (D) (when utilized), the particular organosilicon compound to be prepared, etc. For example, the reaction may be carried out under homogeneous conditions (e.g. in a solution state). However, the reaction may be conducted heterogeneously, e.g. with one or more components suspended, but not dissolved, in the carrier vehicle. For example, the reaction may be carried out heterogeneously with the catalyst particles of component (C) suspended in the carrier vehicle. When component (B) is ethylene, the ethylene is typically utilized in the gaseous state. The other components, however, may be employed as heterogeneous mixtures (i.e., suspensions, colloids, etc.) or homogeneous mixtures/solutions (i.e., dissolved and/or disposed in a carrier vehicle prior to forming the reaction mixture therewith).

When utilized, the carrier vehicle is typically selected based on the particular organohydridochlorosilane compound (A), alkene compound (B), catalyst particles (C), and/or olefin compound (D) (when utilized) selected, as well as the particular organosilicon compound to be prepared. For example, the some embodiments, the carrier vehicle comprises, alternatively is, an oil (e.g. an organic oil and/or a silicone oil), a fluid, a solvent, etc., or a combination thereof. Examples of suitable carrier vehicles include those described herein, such as those described above with respect to the carrier fluid of the preparation method. As such, in certain embodiments, the carrier vehicle is the same as the carrier fluid utilized in the preparation method. As such, in these or other embodiments, the carrier vehicle comprises, alternatively is an aromatic solvent. In some such embodiments, the carrier vehicle comprises, alternatively is, an aromatic organic solvent, such as benzene, toluene, xylene, mesitylene, or the like, or a combination thereof.

When utilized, portions of carrier vehicle or solvent may be added to or otherwise combined with the organohydridochlorosilane compound (A), alkene compound (B), catalyst (C), and/or olefin compound (D) (when utilized) discretely, collectively with mixtures of components (A), (B), (C) and/or (D), or with the reaction mixture as a whole. The total amount of carrier vehicle/solvent present in the reaction mixture will be selected by one of skill in the art, e.g. based on the particular components (A), (B), (C), and/or (D) selected, the reaction parameters employed, etc.).

In some embodiments, the reaction is carried out at the elevated temperature. The elevated temperature will be selected and controlled depending on the particular organohydridochlorosilane compound (A), alkene compound (B), catalyst (C), and/or olefin compound (D) selected, the reaction vessel utilized (e.g. whether open to ambient pressure, sealed, under positive pressure (e.g. positive pressure of ethylene, when utilized as the alkene compound (B)), the presence and boiling point of carrier vehicle, etc. Accordingly, the elevated temperature will be readily selected by one of skill in the art in view of the reaction conditions and parameters selected and the description herein. The elevated temperature for preparing the organosilicon compound is typically from greater than ambient temperature to 300° C., such as from 40 to 250, alternatively from 50 to 200, alternatively from 60 to 175, alternatively from 60 to 150, alternatively from 60 to 125° C.

The dehydrogenative coupling reaction may be conducted at elevated pressure (e.g. super-atmospheric pressure). For example, the reaction may be conducted at a pressure of from greater than ambient pressure to 200,000 kPa, such as from greater than 101.3 to 20,000, alternatively from 110 to 10,000, alternatively from 150 to 5,000, alternatively from 200 to 2,000, alternatively from 200 to 1,000, alternatively from 250 to 1,000, alternatively from 250 to 750 kPa.

It is to be appreciated that the elevated temperature and/or pressure may also differ from the ranges set forth above, especially when both elevated temperature and pressure are utilized. In specific embodiments, the elevated temperature and pressure are collectively selected to provide supercritical conditions with regard to one or both of components (A) and (B). Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A) and (B) to prepare the organosilicon compound is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 48, alternatively from 3 to 36, alternatively from 4 to 24, alternatively of 6, 12, 18, 24, 36, or 48 hours, as will be readily determined by one of skill in the art (e.g. by monitoring conversion of the organohydridochlorosilane compound (A), production of the organosilicon compound, etc., via chromatographic and/or spectroscopic methods). In certain embodiments, the time during which the reaction is carried out is from greater than 0 to 48 hours, such as from 1 to 36, alternatively from 1 to 24, alternatively from 1 to 12, alternatively from 2 to 12, alternatively from 2 to 10 hours after components (A) and (B) are combined in the presence of catalyst (C), optionally after reaching the elevated temperature and/or pressure.

Generally, the reaction of components (A) and (B) prepares a reaction product comprising the organosilicon compound. In particular, over the course of the reaction, the reaction mixture comprising components (A) and (B) comprises increasing amounts of the organosilicon compound and decreasing amounts of components (A) and (B). Once the reaction is complete (e.g. one of components (A) and (B) is consumed, no additional organosilicon compound is being prepared, etc.), the reaction mixture may be referred to as a reaction product comprising the organosilicon compound. In this fashion, the reaction product typically includes any remaining amounts of components (A), (B), (C), and optionally (D), as well as degradation and/or reaction products thereof (e.g. byproducts and/or other materials) and any carrier vehicle or solvent utilized.

In certain embodiments, the synthesis method further comprises isolating and/or purifying the organosilicon compound from the reaction product. As used herein in the context of the synthesis method, isolating the organosilicon compound refers to increasing the relative concentration of the organosilicon compound as compared to other compounds in combination therewith (e.g. in the reaction product or a purified version thereof). As such, as is understood in the art, isolating/purifying may comprise removing the other compounds from such a combination (i.e., decreasing the amount of impurities/other components combined with the organosilicon compound, e.g. in the reaction product) and/or removing the organosilicon compound itself from the combination. Any suitable technique and/or protocol for isolation may be utilized, including those described above with respect to the preparation method (e.g. distilling, stripping/evaporating, extracting, filtering, washing, partitioning, phase separating, chromatography, etc.), as well as combinations thereof (e.g. in sequence, as part of a single procedure, etc.). It is to be appreciated that isolating may include, and thus may be referred to as, purifying the organosilicon compound. However, purifying the organosilicon compound may comprise alternative and/or additional techniques as compared to those utilized in isolating the organosilicon compound. Regardless of the particular technique(s) selected, isolation and/or purification of organosilicon compound may be performed in sequence (i.e., in line) with the reaction itself, and thus may be automated. In other instances, purification may be a stand-alone procedure to which the reaction product comprising the organosilicon compound is subjected. In certain embodiments, where the alkene compound (B) is gaseous (e.g. when ethylene is utilized as the alkene compound (B)), the organosilicon compound is purified by venting and/or purging the reaction vessel and reaction product, thus removing any remaining alkene compound (B) and hydrogen ($H_2$) prepared during the reaction from the reaction product. In some such embodiments, the reaction product is cooled prior to and/or during the venting and or purging.

In particular embodiments, the synthesis method includes isolating the organosilicon compound from the reaction product via distillation, where the organosilicon compound is removed from one or more components of the reaction product (e.g. the catalyst (C)) as distillate. The distillation is typically carried out at sub-atmospheric pressure and temperature (i.e., reduced temperature and reduced pressure). The reduced pressure and temperature will be selected by one of skill in the art in view of the reaction conditions and parameters selected, the components utilized, the organosilicon compound prepared, etc. The reduced pressure is typically operated as a vacuum, although any reduced pressure between vacuum and atmospheric pressure (i.e., 101.325 kPa) may be utilized. For example, the reduced pressure may be from greater than 0 to 50, alternatively from greater than 0 to 40, alternatively from greater than 0 to 30, alternatively from greater than 0 to 20, alternatively from greater than 0 to 10, alternatively from greater than 0 to 5, alternatively from greater than 0 to 4, alternatively from greater than 0 to 3, alternatively from greater than 0 to 2 kPa (e.g. as measured by mmHg).

Typically, the reaction product prepared by the reaction of components (A) and (B) includes a catalyst residue comprising a ruthenium complex. The ruthenium complex of the catalyst residue may be the same as, alternatively substantially the same as, the Ru(0) complex utilized in or as the catalyst particles of component (C) in the reaction. Alternatively, the ruthenium complex of the catalyst residue may be formed from the catalyst particles utilized in or as component (C) (i.e., from the Ru(0) complex of the catalyst particles) in the reaction (i.e., during the reaction itself).

In certain embodiments, the synthesis method includes isolating the catalyst residue from the reaction mixture, e.g. using one or more of the techniques described above. In some embodiments, isolating the organosilicon compound from the reaction product via distillation isolates the catalyst residue by removing other components of the reaction product as distillate therefrom. In other embodiments, such as when the reaction is carried out under heterogeneous conditions, the synthesis method includes filtering the reaction mixture, thus isolating the catalyst residue therefrom as filtrand, with the remaining components of the reaction mixture separated therefrom as filtrate.

The isolated catalyst residue may be utilized to catalyze another dehydrogenative coupling reaction, e.g. of components (A) and (B), optionally in the presence of component (D), as described above. As such, in certain embodiments, the synthesis method comprises using the catalyst residue (i.e., reusing the catalyst (C)) to catalyze a further dehydrogenative coupling reaction, which may be the same as or different from the initial reaction use to prepare the catalyst residue. It will be appreciated that the reuse of the catalyst (C) in this fashion may be conducted any number of times, for any number of sequential independently selected dehydrogenative coupling reactions, which may each be the same as or different from any other of the dehydrogenative coupling reactions (e.g. with regard to the particular type and/or amounts of components (A), (B), and/or (D) selected, parameters employed, etc.). In certain embodiments, the catalyst (C) is reused at least once, alternatively at least twice, alternatively at least 3, 4, 5, 6, 7, 8, 9, or 10 times.

The synthesis method utilizing the catalyst particles may prepare the organosilicon compound in high yields, with very high conversion rates and excellent selectivity. For example, in certain embodiments, the synthesis method in accordance with the parameters above provides a conversation rate of at least 95, alternatively at least 98, alternatively at least 99%, based on the amount of the organohydridochlorosilane compound (A) utilized (e.g. as measured via gas chromatography (GC), according to the procedure described below). In these or other embodiments, the synthesis method provides a yield of the organosilicon compound of at least 65, alternatively at least 70, alternatively at least 75, alternatively at least 80, alternatively at least 85%, based on the amount of the organohydridochlorosilane compound (A) utilized (e.g. as measured via gas chromatography (GC), according to the procedure described below). In these or other embodiments, the synthesis method provides a selectivity for dehydrogenative silylation (DHS) versus hydrosilylation (DS) of at least 70:30, alternatively at least 75:25, alternatively at least 80:20, alternatively at least 85:15 (DHS:DS).

As introduced above, the synthesis method prepares the organosilicon compound. More specifically, as will be understood in view of the description of the structure of components (A) and (B) and parameters of the reaction thereof, the method prepares the organosilicon compound as a dehydrogenative coupling product of the organohydridochlorosilane compound (A) and the alkene compound (B). As will be appreciated by those of skill in the art, the particular organosilicon compound prepared is a function of the particular organohydridochlorosilane compound (A) utilized in the synthesis method. More specifically, the organohydridochlorosilane compound (A) forms an organochlorosilane backbone of the organosilicon compound, and the alkene compound (B) forms an alkenyl group bonded to a silicon atom of the organochlorosilane backbone. As such, the organosilicon compound may be further defined as an organoalkenylchlorosilane compound.

In particular embodiments, the organosilicon compound has the general formula $(R^1CHCH)SiCl_xR_{3-x}$, where each R, $R^1$, and subscript x are as defined above. For example, in some embodiments, where the organohydridochlorosilane compound (A) is further defined as the diorganohydridochlorosilane (e.g., where subscript x is 1, such that compound (A) has the formula $HSiClR_2$), the synthesis method prepares the organosilicon compound as a diorganochloroalkenylsilane compound having the formula ($R^1$CHCH)SiClR$_2$, where each R and $R^1$ is as defined above. In other embodiments, where the organohydridochlorosilane compound (A) is further defined as the organohydridodichlorosilane (e.g., where subscript x is 2, such that compound (A) has the formula HSiCl$_2$R), the synthesis method prepares the organosilicon compound as an organodichloroalkenylsilane compound having the formula ($R^1$CHCCH)SiCl$_2$R, where each R and $R^1$ is as defined above.

As introduced above, in certain embodiments, the alkene compound (B) is ethylene. In such embodiments, $R^1$ is H, such that the organosilicon compound may be further defined as an organochlorovinylsilane compound having the general formula (H$_2$CCH)SiCl$_x$R$_{3-x}$, where each R subscript x are as defined above. In some embodiments, each R is an alkyl group, such that the organosilicon compound is further defined as a dialkylchlorovinylsilane or an alkyldichlorovinylsilane. In certain embodiments, each R is methyl (i.e., —CH$_3$), such that the organosilicon compound is further defined as dimethylchlorovinylsilane or methyldichlorovinylsilane. It will be appreciated that the organosilicon compound may comprise a combination of such compounds as well, i.e., when more than one of the organohydridochlorosilane compound (A) is utilized in the synthesis method.

The organosilicon compound prepared according to the synthesis method may be utilized in diverse end use applications, e.g. as a discrete component in a composition, including a curable composition, a personal care or cosmetic composition, etc. Because the organosilicon compound includes at least one aliphatically unsaturated group per molecule (e.g. the silicon-bonded alkenyl group prepared from the alkene compound (B), the organosilicon compound may be utilized in further reactions, e.g. in a hydrosilylation reaction. For example, the organosilicon compound may be a component in a hydrosilylation-curable composition.

The following examples are intended to illustrate the embodiments described herein and are not to be viewed in any way as limiting to the scope of the invention.

Characterization Procedures

Gas Chromatography (GC)

Gas chromatography (GC) data are obtained using an Agilent 7890A gas chromatograph fitted with a Thermo Scientific TG-5HT column. Detection of the eluting species is accomplished using a flame ionization detector (FID). A sample (1 µL) is injected onto the column, which is held at 40° C. for 8 minutes from time of injection, after which the temperature increased to 300° C. at a rate of 15° C./min. Elution times are determined by injection of standards, and product quantification was determined by integration of elution signal areas. Exemplary standards (with elution times) include chlorodimethylsilane (1.90 min.), dichloromethylsilane (1.93 min.), chlorodimethylvinylsilane (2.44 min.), dichloromethylvinylsilane (2.79 min.), chlorodimethyl(ethyl)silane (2.62 min.), and dichloromethyl(ethyl) silane (3.05 min.).

Ultraviolet-Visible Spectroscopy (UV-Vis)

Ultraviolet-Visible (UV-Vis) absorbance spectra are recorded using a Shimadzu UV-1800 double beam spectrophotometer with deuterium and tungsten-halogen lamps and a silicon photodiode detector. A sample and a blank (pure solvent) are loaded into matched quartz cuvettes, and absorbance is recorded from 320 to 1000 nm at increments of 1 nm.

Certain components utilized in the Examples are set forth in Table 1 below.

TABLE 1

Components and Materials Utilized

| Compound | Description |
| --- | --- |
| Hydridosilane (A-1) | Chlorodimethylsilane (Cl(CH$_3$)$_2$SiH) |
| Alkene Compound (B-1) | Ethylene |
| Ru(0) Complex (R-1) | Triruthenium dodecacarbonyl (Ru$_3$(CO)$_{12}$) |
| Ligand Precursor (L-1) | Triphenylphosphine |
| Ligand Precursor (L-2) | (Pentafluorophenyl)diphenylphosphine |
| Ligand Precursor (L-3) | Tris(pentafluorophenyl)phosphine |
| Ligand Precursor (L-4) | Tris(3,5-bis(trifluoromethyl)phenyl)phosphine |
| Carrier Fluid (F-1) | Mesitylene |
| Solvent (S-1) | Toluene |

Examples 1-4

Preparation of Ru(0) Catalyst Particles

Various Ru(0) catalyst particles are prepared to give Examples 1-4. In particular, a Ru(0) Complex (R), Ligand Precursor (L), and Carrier Fluid (F) are combined in a round bottom flask to form a mixture, which is then stirred at room temperature for 20 minutes. The mixture is then warmed to and held at 40° C. with stirring for 20 minutes. The mixture is then incrementally warmed to and held at increasing target temperatures (heating increments: 20° C.; hold times: 20 min; target temperatures: 60, 80, 100, 120, 140, and 160° C.) with stirring to give a reaction product comprising Ru(0) catalyst particles, while collecting samples from the mixture at the end of each hold time at each target temperature. The samples are evaluated for opacity (visual) and absorbance (UV-Vis) to ascertain particle formation/nucleation, with a nucleation start temperature reported as the lowest temperature at which visible particles or a significant change in the absorbance spectrum of the mixture is observed. The reaction product is then centrifuged (4,000 rpm; 10 minutes) to evaluate isolation/concentration of the Ru(0) catalyst particles (pellet) from the soluble components of the reaction product (supernatant). Certain parameters, properties, and evaluation results of Examples 1-4 are set forth in Table 2 below.

TABLE 2

Parameters and Properties of Examples 1-4

| Example: | Ex. 1 | Ex. 2 | Ex. 3 | Ex. 4 |
| --- | --- | --- | --- | --- |
| Ru(0) Complex (R-1) (mg [µmol Ru]): | 5 [7.8] | 5 [7.8] | 5 [7.8] | 5 [7.8] |
| Carrier Fluid (F-1) (mL): | 10 | 10 | 10 | 10 |
| Ligand Precursor (L-1) (mg [µmol]): | 12.3 [47] | N/A | N/A | N/A |
| Ligand Precursor (L-2) (mg [µmol]): | N/A | 16.5 [47] | N/A | N/A |
| Ligand Precursor (L-3) (mg [µmol]): | N/A | N/A | 25.03 [47] | N/A |

TABLE 2-continued

Parameters and Properties of Examples 1-4

| Example: | Ex. 1 | Ex. 2 | Ex. 3 | Ex. 4 |
|---|---|---|---|---|
| Ligand Precursor (L-4) (mg [µmol]): | N/A | N/A | N/A | 31.5 [47] |
| Absorbance Change (Y/N): | Yes | Yes | Yes | Yes |
| Nucleation Start Temp. (C.): | 100 | N/A | 140 | 140 |
| Particles Visible (Y/N): | Yes | No | Yes | Yes |
| Particles Isolable (Centrifugation) (Y/N): | No | No | Yes | Yes |

In each of Examples 1-4, Ru(0) catalyst particles are prepared in a heterogeneous reaction product, presenting as an opaque suspension. Particle nucleation is evidenced by significant change in the absorbance spectrum of the mixture upon heating, with visible particle formation at temperatures as low as 100° C. (e.g. see Example 1). Depending on the particular parameters employed, the exemplary method prepares Ru(0) catalyst particles of a size sufficient for easy isolation (e.g. see Examples 3-4).

Example 5-7

Preparation of Ru(0) Catalyst Particle Compositions

Various compositions comprising Ru(0) catalyst particles are prepared. In particular, a Ru(0) Complex (R), Ligand Precursor (L), and Carrier Fluid (F) are combined in a round bottom flask to form a mixture. The mixture is heated to and held at 160° C. with stirring for 20 minutes, and then cooled to room temperature to give a reaction product comprising Ru(0) catalyst particles as an opaque suspension (Catalyst Compositions (C1)-(C3)). Particular parameters of Examples 5-7 are set forth in Table 3 below.

Example 8

Preparation of an Isolated Ru(0) Catalyst Particle Composition

A composition comprising isolated Ru(0) catalyst particles is prepared. In particular, a Ru(0) Complex (R), Ligand Precursor (L), and Carrier Fluid (F) are combined in a round bottom flask to form a mixture. The mixture is heated to and held at 160° C. with stirring for 20 minutes to give a reaction product comprising Ru(0) catalyst particles as an opaque suspension, which is then cooled to room temperature. The suspension is then centrifuged (4,000 rpm; 10 minutes) to pelletize the Ru(0) catalyst particles, and the resulting supernatant removed. The Ru(0) catalyst particles are then washed by suspending the pellet in Solvent (S-1) (12 mL), centrifuging the resulting mixture (4,000 rpm; 10 minutes) to re-pelletize the Ru(0) catalyst particles, removing the supernatant from the resulting pellet of Ru(0) catalyst particles, and evaluating the supernatant via UV-Vis. The washing process is repeated until the supernatant is essentially colorless (total washings: four) to isolate the Ru(0) catalyst particles, which are then suspended in Solvent (S-1) (12 mL) to give an opaque suspension (Catalyst Composition (C4)). Particular parameters of Example 8 are set forth in Table 3 below, alongside those of Examples 5-7 above.

TABLE 3

Parameters and Properties of Examples 5-8

| Example: | Ex. 5 | Ex. 6 | Ex. 7 | Ex. 8 |
|---|---|---|---|---|
| Ru(0) Complex (R): | R-1 | R-1 | R-1 | R-1 |
| Amount (R) (mg [µmol Ru]): | 1.9 [9] | 1.9 [9] | 1.9 [9] | 1.9 [9] |
| Ligand Precursor (L): | N/A | L-1 | L-1 | N/A |
| Amount (L) (mg [µmol]): | N/A | 4.7 [18] | 23.5 [90] | N/A |
| Carrier Fluid (F): | F-1 | F-1 | F-1 | F-1 |
| Amount (F) (mL): | 12 | 12 | 12 | 12 |
| Catalyst Composition (C): | C1 | C2 | C3 | C4 |

Examples 9-12

Preparation of Chlorodimethylvinylsilane (ClSi(CH$_3$)$_2$(CHCH$_2$))

Ru(0) catalyst particles are utilized to catalyze a dehydrogenative silylation reaction to prepare a vinylsilane (i.e., as an organosilicon compound). In particular, a Catalyst Composition prepared in one of Examples 5-8 above is transferred to a Schlenk tube via cannula, and charged with Hydridosilane (A). The resulting mixture is then transferred via cannula to a Fischer-Porter tube equipped with a stir bar and a manifold for introduction of ethylene (i.e., Alkene Compound (B-1)). The tube is then pressurized with ethylene to five bar, and then vented. The tube is pressurized with ethylene, followed by venting, four additional times to substantially eliminate nitrogen from the tube. The tube is then pressurized with ethylene to five bar and the resulting reaction mixture warmed to and held at 100° C. with stirring for two hours to give a reaction product. The reaction product is then cooled to −78° C., and the tube vented to remove ethylene. The reaction product is then transferred via cannula to a Schlenk tube, and then to a distillation apparatus with a collection vessel cooled to −78° C. The reaction product is then distilled at sub-atmospheric pressure and at a temperature less than 25° C. to remove a volatile product mixture comprising an organosilicon compound as distillate from a catalyst residue. The distillate is then warmed to room temperature and analyzed by gas chromatography to evaluate conversion of Hydridosilane (A) and yield of the organosilicon compound. Particular parameters and evaluation results of Examples 9-12 are set forth in Table 4 below.

TABLE 4

Parameters and Properties of Examples 9-12

| Example: | Ex. 9 | Ex. 10 | Ex. 11 | Ex. 12 |
|---|---|---|---|---|
| Catalyst Composition (C): | C1 | C2 | C3 | C4 |
| Hydridosilane Compound (A): | A-1 | A-1 | A-1 | A-1 |
| Amount (A) (µL [µmol]): | 100 [9] | 100 [9] | 100 [9] | 100 [9] |
| Alkene Compound (B): | B-1 | B-1 | B-1 | B-1 |

TABLE 4-continued

Parameters and Properties of Examples 9-12

| Example: | Ex. 9 | Ex. 10 | Ex. 11 | Ex. 12 |
|---|---|---|---|---|
| Conversion of (A) (%): | >99 | 74 | >99 | >99 |
| Yield (%): | 76 | 42 | 68 | 83 |

As shown in Table 4 above, the Catalyst Compositions prepared in Examples 5-8 successfully catalyze dehydrogenative coupling reactions (e.g. see Examples 9-12). Moreover, the exemplary methods provide nearly complete conversion of hydridosilane starting material with good yields of the dehydrogenative coupling product. In each of Examples 9-12, chlorodimethylethylsilane is identified as the major side product, evidencing hydrosilylation as a competing reaction under the conditions utilized.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", "perpendicular", and "parallel" are generally employed herein in a relative and not an absolute sense. Further, it will be appreciated that the terms "substantially", "about", "essentially", etc. indicate minor deviations of the property being modified. Such deviation may be of from 0-10%, alternatively of from 0-5%, alternatively of from 0-3% of a particular property.

The invention claimed is:

1. A method of preparing an organosilicon compound, said method comprising:
    preparing a Ru (O) complex by combining a triruthenium complex and a ligand precursor compound to give the Ru(0) complex:
    heating a mixture of the Ru(0) complex in a carrier fluid at an elevated temperature to nucleate the Ru(0) complex and give catalyst particles in the carrier fluid;
    optionally, isolating the catalyst particles from the carrier fluid; and
    reacting via dehydrogenative coupling (A) an organohydridochlorosilane compound and (B) unsubstituted ethylene in the presence of (C) a catalyst, thereby preparing the organosilicon compound:
    wherein the catalyst (C) comprises the catalyst particles;
    wherein (i) the triruthenium complex comprises $Ru_3(CO)_{12}$;
    wherein the ligand precursor compound comprises: (i) a phosphorous compound; (ii) an amine compound; or (iii) both (i) and (i); and
    wherein: (i) the organohydridochlorosilane compound (A) comprises chlorodimethylsilane and the organosilicon compound comprises chlorodimethylvinylsilane: (ii) the organohydridochlorosilane compound (A) comprises dichloromethylsilane and the organosilicon compound comprises dichloromethylvinylsilane; or (ii) both (i) and (ii).

2. The method of claim 1, wherein the triruthenium complex and the ligand precursor compound are combined in the presence of the carrier fluid to give the Ru(0) complex in combination with the carrier fluid, thereby preparing the mixture.

3. The method of claim 1, wherein the ligand precursor compound comprises the phosphorous compound, and wherein: (i) the phosphorous compound comprises an organophosphine or organophosphite: (ii) the phosphorous compound is selected from substituted or unsubstituted triarylphosphines, tricycloalkylphosphines bis (diary phosphino)alkanes, bis(dicycloalkylphosphino)alkanes, triarylphosphites, and combinations thereof; or (iii) both (i) and (ii).

4. The method of claim 1, wherein the catalyst particles are free from any support material on which the Ru(0) complex nucleates.

5. The method of claim 1, wherein: (i) the elevated temperature is from 80 to 200° C.; (ii) the mixture is heated at the elevated temperature step-wise to a target temperature: (i) the mixture is mixed prior to and/or during heating the mixture; (iv) the carrier fluid comprises an aromatic solvent; (v) the method further comprises selectively controlling average particle size of the catalyst particles: or (vi) any combination of (i) to (v).

6. The method of claim 1, comprising isolating the catalyst particles from the carrier fluid, and wherein isolating the catalyst particles comprises:
    (I) centrifuging the catalyst particles in the carrier fluid to give a sediment comprising the catalyst particles and supernatant comprising the carrier fluid; and
    (II) separating the sediment from the supernatant, thereby isolating the catalyst particles; and
    (III) optionally, purifying the catalyst particles isolated in (II) via differential centrifugation by repeating (I) and (II).

7. The method of claim 1, wherein dehydrogenative coupling of components (A) and (B) is carried out further in the presence of (D) an olefin compound different from the component (B) and having an aliphatic unsaturated group.

8. The method of claim 1, wherein the organosilicon compound is prepared in a reaction product comprising a catalyst residue, and wherein the method further comprises:
    isolating the catalyst residue from the reaction product; and
    optionally, using the catalyst residue to catalyze a further dehydrogenative coupling reaction.

9. The method of claim 1, wherein dehydrogenative coupling is carried out: (i) at an elevated temperature greater than 60° C.; (ii) at an elevated pressure from greater than atmospheric pressure to 10 bar; (iii) at a molar ratio of component (B) to organohydridochlorosilane compound (A) of from 1 to 10 (B):(A); (iv) in the presence of a solvent; or (v) any combination of (i) to (iv).

10. The method of claim 1, having: (i) a conversion of the organohydridochlorosilane compound (A) of at least 95%; (ii) a yield of the organosilicon compound of at least 75%; (iii) a selectivity for dehydrogenative silylation (DHS) versus hydrosilylation (DS) of at least 70:30 (DHS:DS); or (iv) any combination of (i) to (iii).

* * * * *